US012131070B2

(12) United States Patent
Jung et al.

(10) Patent No.: US 12,131,070 B2
(45) Date of Patent: Oct. 29, 2024

(54) MEMORY SYSTEM FOR OPTIMIZING PARAMETER VALUES ACCORDING TO WORKLOAD CLASS AND DATA PROCESSING SYSTEM INCLUDING THE SAME

(71) Applicant: SK hynix Inc., Gyeonggi-do (KR)

(72) Inventors: In Ho Jung, Gyeonggi-do (KR); Ki Tae Kim, Gyeonggi-do (KR); Seon Ju Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 52 days.

(21) Appl. No.: 18/070,610

(22) Filed: Nov. 29, 2022

(65) Prior Publication Data

US 2023/0418521 A1 Dec. 28, 2023

(30) Foreign Application Priority Data

Jun. 28, 2022 (KR) ........................ 10-2022-0079070

(51) Int. Cl.
*G06F 3/06* (2006.01)
(52) U.S. Cl.
CPC .......... *G06F 3/0659* (2013.01); *G06F 3/0611* (2013.01); *G06F 3/0629* (2013.01); *G06F 3/0679* (2013.01)
(58) Field of Classification Search
CPC .... G06F 3/0659; G06F 3/0611; G06F 3/0629; G06F 3/0679
See application file for complete search history.

(56) References Cited

U.S. PATENT DOCUMENTS

| 7,107,403 | B2 | 9/2006 | Modha et al. | |
|---|---|---|---|---|
| 10,642,764 | B1* | 5/2020 | Gerhart | G06F 12/10 |
| 11,392,315 | B1* | 7/2022 | Cady | G06F 3/0605 |
| 2014/0095827 | A1* | 4/2014 | Wei | G06F 3/0644 711/203 |
| 2014/0325095 | A1* | 10/2014 | Kang | G06F 11/3034 710/16 |
| 2015/0286507 | A1* | 10/2015 | Elmroth | G06F 9/5061 718/104 |
| 2015/0324135 | A1* | 11/2015 | Chan | G06F 3/0689 711/146 |
| 2018/0074724 | A1* | 3/2018 | Tremblay | G06F 3/0689 |
| 2019/0377508 | A1* | 12/2019 | Bahar | G06F 3/061 |
| 2020/0026465 | A1* | 1/2020 | Jung | G06F 12/0246 |

(Continued)

FOREIGN PATENT DOCUMENTS

KR 10-2098246 B1 4/2020

*Primary Examiner* — Ryan Bertram
(74) *Attorney, Agent, or Firm* — IP & T GROUP LLP

(57) ABSTRACT

A memory system comprising: a memory device having a nonvolatile specific storage space configured to store workload information including groups of parameter values, grouped respectively corresponding to a plurality of workload classes in a table form, and a controller configured to detect a ratio of a set command inputted from an outside in a set operation mode, select one of the workload classes as a detected class, load, from the specific storage space, one of the groups corresponding to the detected class, process the set command under an execution condition determined by applying the loaded group, and update the group corresponding to the detected class with parameter values inputted from the outside.

13 Claims, 4 Drawing Sheets

(56) References Cited

U.S. PATENT DOCUMENTS

2020/0097201 A1*  3/2020  Irshad ..................... G06F 3/068
2021/0157512 A1*  5/2021  Tarango .............. G06F 12/0246
2023/0384977 A1*  11/2023 Park ...................... G06F 3/0679

* cited by examiner

MEMORY SYSTEM FOR OPTIMIZING PARAMETER VALUES ACCORDING TO WORKLOAD CLASS AND DATA PROCESSING SYSTEM INCLUDING THE SAME

CROSS-REFERENCE TO RELATED APPLICATION

This application claims priority under 35 U.S.C. § 119 to Korean Patent Application No. 10-2022-0079070 filed on Jun. 28, 2022, which is incorporated herein by reference in its entirety.

BACKGROUND

1. Field

Various embodiments of the present disclosure relate to a memory system, and particularly, to a memory system for optimizing parameter values according to a workload class and a data processing system including the same.

2. Discussion of the Related Art

Recently, a computer environment paradigm has shifted to ubiquitous computing, which enables a computer system to be accessed anytime and everywhere. As a result, the use of portable electronic devices such as mobile phones, digital cameras, notebook computers and the like has increased. Such portable electronic devices typically use or include a memory system that uses or embeds at least one memory device, i.e., a data storage device. The data storage device can be used as a main storage device or an auxiliary storage device of a portable electronic device.

In a computing device, unlike a hard disk, a data storage device implemented as a nonvolatile semiconductor memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

In terms of performance of the data storage device, uniformity of time required for processing a command requested from the outside and data throughput per hour may be in a trade-off relationship with each other.

Accordingly, in order to improve the performance of the data storage device, the data storage device may be required to operate in a state in which the uniformity of time required for processing a requested command and the data throughput per hour are optimized.

SUMMARY

Various embodiments of the present disclosure are directed to providing a memory system, which is manufactured in a state of storing parameter values therein according to a workload class and then optimizes the parameter values according to a workload class in conjunction with a host in a mounting process, and a data processing system including the same.

Technical problems to be achieved in the present disclosure are not limited to the aforementioned technical problems and the other unmentioned technical problems will be clearly understood by those skilled in the art from the following description.

In an aspect of an embodiment in the present disclosure, a memory system may include: a memory device having a nonvolatile specific storage space configured to store workload information including groups of parameter values, grouped respectively corresponding to a plurality of workload classes in a table form; and a controller configured to detect a ratio of a set command inputted from an outside in a set operation mode, select one of the workload classes as a detected class, load, from the specific storage space, one of the groups corresponding to the detected class, process the set command under an execution condition determined by applying the loaded group, and update the group corresponding to the detected class with parameter values inputted from the outside.

In an aspect of an embodiment in the present disclosure, an operation method of a data processing system including a memory system and an external device, the memory system including a specific storage space having nonvolatile characteristics and the external device for controlling an operation of the memory system, the operation method may include: generating, by a test on the memory system, workload information including groups of parameter values in a table form, the groups corresponding to respective workload classes; storing, by the memory system, the workload information in the specific storage space; determining, by the external device, one of the plurality of workload classes as a determined class; generating, by the external device, a set command at a ratio corresponding to the determined class; outputting, by the external device, the set command to the memory system; detecting, by the memory system, the ratio of the set command inputted from the external device; selecting, by the memory system, one of the plurality of workload classes as a detected class according to a result of the detecting the ratio; processing, by the memory system, the set command under an execution condition determined by applying the group corresponding to the detected class from the workload information; detecting, by the external device, a performance result of the memory system through a result of the processing; generating, by the external device, parameter values corresponding to the performance result; and outputting, by the external device, the parameter values corresponding to the performance result to the memory system; and updating, by the memory system, the parameter values corresponding to the detected class with the parameter values inputted from the external device.

In an aspect of an embodiment in the present disclosure, a data processing system may include: a memory system configured to store, in an internal specific storage space having nonvolatile characteristics, workload information including groups of parameter values in a table form, the groups corresponding to respective workload classes, detect a ratio of a set command inputted from an external device in a set operation mode, select one of the plurality of workload classes as a detected class according to a result of the detecting the ratio, process the set command under an execution condition determined by applying the group corresponding to the detected class from the workload information, and update the group corresponding to the detected class with parameter values inputted from the external device; and the external device configured to generate the set command at the ratio corresponding to one determined class of the plurality of workload classes, output the set command to the memory system, detect a performance result of the memory system through a result of the processing, generate the parameter values corresponding to the performance result, and output the parameter values to the memory system.

In an aspect of an embodiment in the present disclosure, an operating method of a controller, the operating method may include: controlling a nonvolatile memory device to store therein different groups of parameter values affecting performance of the memory device; processing a request by applying thereto a selected group of the groups to output a result of the processing, the selected group corresponding to a reception ratio of the request; and controlling the memory device to update the selected group by receiving an updated version thereof, into which the performance represented by the result is reflected.

The present technology may store parameter values according to a workload class determined through a test in a nonvolatile area inside a memory system, optimize parameter values according to the workload class according to the result of operating the memory system in conjunction with a host in a mounting process, and update the optimized parameter values to the nonvolatile area inside the memory system.

Consequently, the memory system may operate in a state of optimizing the parameter values according to the workload class.

DETAILED DESCRIPTION

Figure 1:
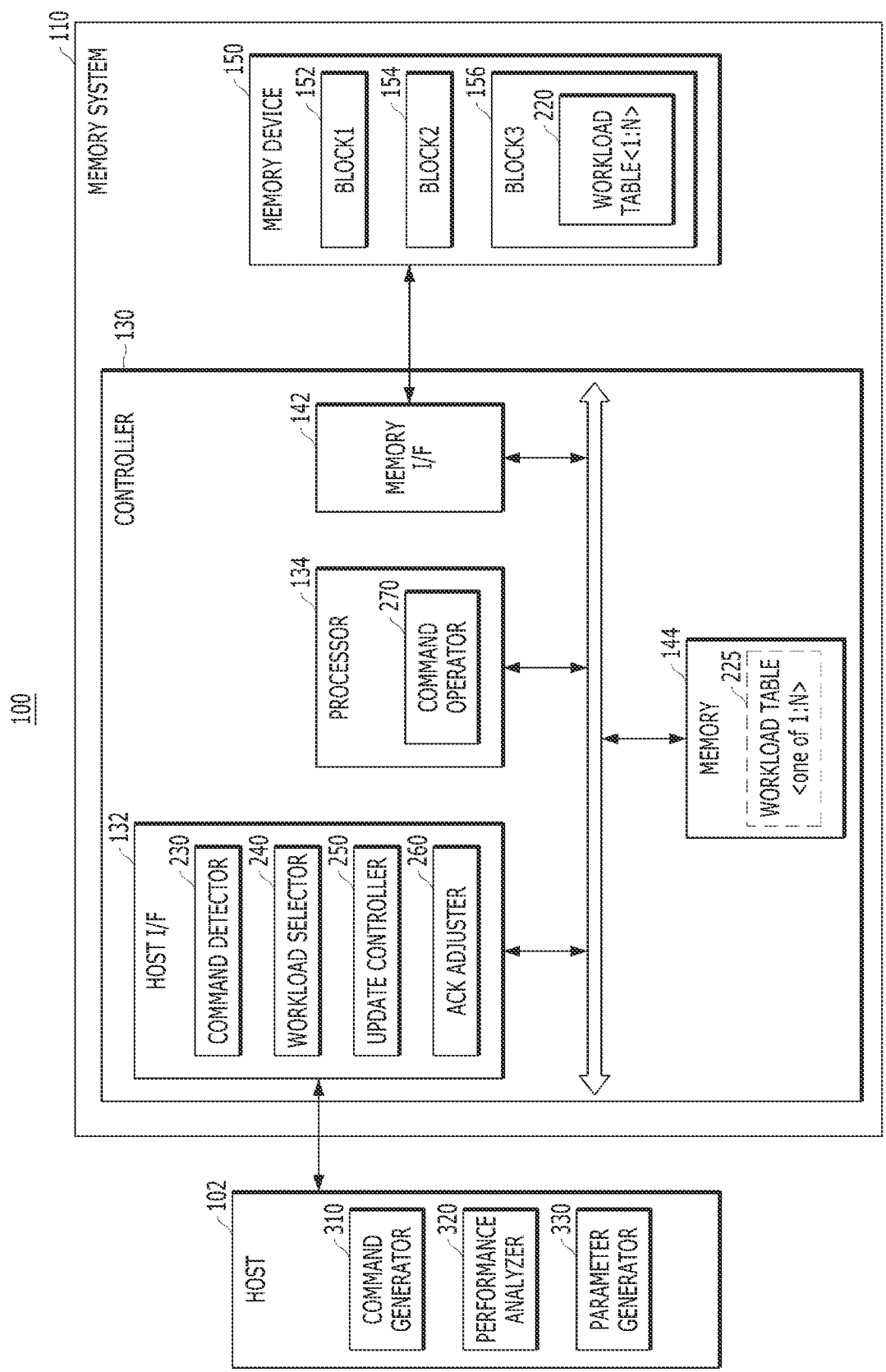
FIG. 1 is a diagram for describing a data processing system in accordance with an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in the disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

FIG. 1 is a diagram for describing a data processing system in accordance with an embodiment of the present disclosure.

Referring to FIG. 1, the data processing system 100 may include a host 102 engaged or operably coupled with the memory system 110.

The host 102 may include any of a portable electronic device, such as a mobile phone, an MP3 player, a laptop computer, or the like, and an electronic device, such as a desktop computer, a game player, a television (TV), a projector, or the like.

The host 102 also includes at least one operating system (OS), which can generally manage and control, functions and operations performed in the host 102. The OS can provide interoperability between the host 102 engaged with the memory system 110 and the user using the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

In summary, the host 102 may mean any 'external device' for controlling the operation of the memory system 110 outside the memory system 110.

The memory system 110 operates in response to a request of the host 102, and, in particular, stores data to be accessed by the host 102. That is, the memory system 110 may be used as a main memory device or an auxiliary memory device of the host 102. The memory system 110 may be implemented as any of various types of storage devices, depending on a host interface protocol which is coupled with the host 102. For example, the memory system 110 may be implemented as one of a solid state driver (SSD), a multi-media card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and a flash memory.

The memory system 110 may include a controller 130 and a memory device 150. The memory device 150 may store data to be accessed by the host 102. The controller 130 may control an operation of storing data in the memory device 150.

The controller 130 and the memory device 150 included in the memory system 110 may be integrated into a single semiconductor device, which may be included in any of the various types of memory systems as discussed above in the examples.

By way of example but not limitation, the controller 130 and memory device 150 may be implemented with an SSD. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The controller 130 in the memory system 110 may control the memory device 150 in response to a request from the host 102. For example, the controller 130 may provide data read from the memory device 150, to the host 102, and may store data provided from the host 102, in the memory device 150. To this end, the controller 130 may control read, write, program, and erase operations of the memory device 150.

According to an embodiment, when a write request is inputted from the host 102, the controller 130 may receive write data to be stored in the memory device 150 and a logical address (la) for identifying the write data from the host 102. The controller 130 may convert the inputted logical address into a physical address (pa) indicating physical addresses of memory cells in which the write data is to be stored among the memory cells included in the memory device 150. For example, one physical address may correspond to one physical page. The controller 130 may provide a write command for storing data, a physical address, and write data to the memory device 150.

According to another embodiment, when a read request is inputted from the host 102, the controller 130 may receive a logical address corresponding to the read request from the host 102. The logical address corresponding to the read request may be a logical address for identifying read-requested data. The controller 130 may acquire the logical address corresponding to the read request and a mapped physical address from map data indicating the correspondence between the logical address provided by the host 102 and the physical address of the memory device 150. Then, the controller 130 may provide a read command and a physical address to the memory device 150.

During an erase operation, the controller 130 may provide an erase command and a physical block address to the memory device 150.

In an embodiment, the controller 130 may autonomously generate a command, an address, and data regardless of a request from the host 102, and may transmit the command, the address, and the data to the memory device 150. For example, the controller 130 may provide commands, addresses, and data to the memory device 150 to perform background operations, such as a program operation for wear leveling and a program operation for garbage collection.

The memory device 150 in the memory system 110 may include a nonvolatile memory area capable of retaining stored data even though power is not supplied, particularly store data provided from the host 102 through a write operation, and provide the stored data to the host 102 through a read operation.

A memory block may be a unit by which data is erased. In an embodiment, the memory device 150 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM).

According to an embodiment, the memory device 150 may be implemented as a three-dimensional array structure. The present disclosure may be applied not only to a flash memory device in which a charge storage layer is formed of a conductive floating gate (FG), but also to a charge trap flash (CTF) in which the charge storage layer is formed of an insulating layer.

The memory device 150 according to the embodiment of the present disclosure may include at least partially a NAND flash memory having nonvolatile characteristics. That is, the memory device 150 may include at least partially a nonvolatile memory area therein.

Specifically, the nonvolatile memory area included in the memory device 150 may include a plurality of memory blocks 152, 154, and 156. In such a case, the memory block may be a unit for performing an erase operation for erasing data stored in the memory device 150. That is, data stored in substantially the same memory block may be simultaneously erased.

The nonvolatile memory region included in the memory device 150 may also include a plurality of planes each including the plurality of memory blocks 152, 154, and 156. The nonvolatile memory region included in the memory device 150 may also include a plurality of memory dies each including a plurality of planes. In such a case, each of the plurality of planes may be an independently operable area. That is, each of the plurality of planes may independently perform one of a write operation, a read operation, and an erase operation.

Each of the plurality of memory blocks 152, 154, and 156 may include a plurality of word lines. In such a case, each of the plurality of word lines may logically include at least one page. That is, the memory block may be classified into a single-level cell (SLC), a multi-level cell (MLC), and the like according to the number of bits that may be stored or expressed in one memory cell. In such a case, the page may be a unit for storing data in the memory device 150 or reading data stored in the memory device 150. That is, a physical address provided by the controller 130 to the memory device 150 during a write operation or a read operation may be an address for identifying a specific page.

According to an embodiment, when a single-level cell is included, each of the plurality of word lines may logically include one page. According to another embodiment, when a 2-bit multi-level cell is included, each of the plurality of word lines may logically include two pages. According to still another embodiment, when a triple level cell (TLC), which is a 3-bit multi-level cell, is included, each of the plurality of word lines may logically include three pages. According to yet another embodiment, when a quadruple level cell (QLC), which is a 4-bit multi-level cell, is included, each of the plurality of word lines may logically include four pages.

As a concept including various elements that may be evaluation indicators of the operation of the memory system 110, quality of service (QOS) may be used. The QOS may include data throughput per hour, capacity, data persistency, data reliability, latency, uniformity of response time, predictability of response time, power consumption, and the like.

Particularly, the memory system 110 in accordance with an embodiment of the present disclosure may operate at any of a plurality of workload classes, and the QOS of the memory system 110 may be adjusted according to a workload class at which the memory system 110 operates. That is, the memory system 110 may adjust an execution condition for processing a command requested from the host 102, according to a workload class at which the memory system 110 operates among a plurality of workload classes, so that the QOS of the memory system 110 is adjusted.

In the memory system 110, workload information workload table<1:N> 220 including groups of parameter values corresponding to the respective workload classes in the form of a table may be stored in a specific internal storage space having nonvolatile characteristics. For example, when the memory device 150 is a hybrid memory device including both a volatile memory area and a nonvolatile memory area, the workload table<1:N> 220 may be stored in a specific storage space included in the nonvolatile memory area. According to an embodiment, as illustrated in the drawing, the workload table<1:N> 220 may be stored in a third memory block 156 among the plurality of memory blocks 152, 154, and 156 included in the memory device 150. In the illustrated drawing, the third memory block 156 may be a specific storage space having nonvolatile characteristics, and other memory blocks may also be specific storage spaces having nonvolatile characteristics, unlike the example illustrated in the drawing. According to another embodiment, unlike the drawings, a specific storage space having nonvolatile characteristics may be included in the controller 130. In such a case, the workload table<1:N> 220 may be stored in a specific storage space inside the controller 130.

The groups of parameter values corresponding to the respective workload classes included in the workload table<1:N> 220 may broadly refer to parameter values of the memory system 110 capable of controlling the execution condition for processing the command requested from the host 102. Furthermore, when producing the memory system 110, a manufacturer may store the workload table<1:N> 220 generated through a test on the memory system in a specific storage space inside the memory system 110, and then ship the memory system 110. For reference, the test on the memory system 110 may be performed using separate test equipment physically separated from the memory system 110, the controller 130 and the memory device 150 included in the memory system 110.

According to an embodiment, the plurality of workload classes may be classified according to a ratio of read and write commands generated to be transmitted from the host 102 to the memory system 110. For example, the host 102 may generate the read and write commands by selecting one of 100% to 0%, 90% to 10%, 80% to 20%, 70% to 30%, 60% to 40%, 50% to 50%, 40% to 60%, 30% to 70%, 20% to 80%, 10% to 90%, and 0% to 100%, and then transmit the generated read and write commands to the memory system 110. In such a case, the number of the plurality of workload classes is 11 in total, and the memory system 110 may operate at any of the workload classes. For reference, the above-described example is merely an example, and the plurality of workload classes may be classified into various forms according to the type of the host 102 or the type of the memory system 110.

More specifically, when the memory system 110 is connected to the host 102 in accordance with an embodiment of the present disclosure and is mounted for use, the host 102 may determine, as a determined class, one of the plurality of workload classes selectable by the memory system 110, generate a set command at a ratio corresponding to the determined class, and then output the generated command to the memory system 110. In such a case, the set command may include at least one of a read command and a write command. According to an embodiment, the host 102 may know in advance the plurality of workload classes selectable by the memory system 110, and request a user to determine which of the plurality of workload classes is the determined class. That is, the host 102 may determine one of the plurality of workload classes as the determined class according to the selection of the user.

When the memory system 110 in accordance with an embodiment of the present disclosure is connected to the host 102 after shipment and mounted for use, the memory system 110 may select one of the plurality of workload classes as a detected class according to a result of detecting a ratio at which the set command is inputted from the host 102. In such a case, as described above, the ratio at which the host 102 generates the set command may be adjusted according to the determined class determined by the host 102. That is, the operation in which the memory system 110 selects the detected class according to the result of detecting the ratio at which the set command is inputted from the host 102 may be an operation in which the memory system 110 detects the determined class determined by the host 102. Accordingly, the determined class determined by the host 102 among the plurality of workload classes and the detected class selected by the memory system 110 among the plurality of workload classes may be substantially the same workload classes.

After selecting the detected class, the memory system 110 may check parameter values corresponding to the detected class through the workload table<1:N> 220 stored in the internal specific storage space, and process the set command inputted from the host 102 under an execution condition determined by applying the checked parameter values corresponding to the detected class. That is, the memory system 110 may load parameter values corresponding to the detected class from the workload table<1:N> 220 in the specific storage space to an internal storage space having volatile characteristics, and then process the set command inputted from the host 102 under an execution condition determined by applying parameter values workload table <one of 1:N> 225 stored in the internal storage space and corresponding to the detected class.

More specifically, after processing the set command inputted from the host 102, the memory system 110 may output, to the host 102, an execution completion response for notifying the host 102 that the processing of the set command is completed.

According to an embodiment, when the set command is a read command, after completing the execution of a read operation, the memory system 110 may output a response signal indicating that the execution of the read operation is completed together with read data to the host 102 as an execution completion response corresponding to the read command.

According to another embodiment, when the set command is a write command, after completing the execution of a write operation, the memory system 110 may output a response signal indicating that the execution of the write operation is completed to the host 102 as an execution completion response corresponding to the write command.

Then, the host 102 may detect the performance result of the memory system 110 through the execution completion response to the set command outputted from the memory system 110 as a result of executing the set command, and generate parameter values corresponding to the detection result and output the generated parameter values to the memory system 110.

Accordingly, the operation in which the memory system 110 processes the set command under the execution condition determined by applying the parameter values corresponding to the detected class may be an operation in which the memory system 110 performs an operation corresponding to the set command and then adjusts the time point at which an execution completion response generated as a result of completing the execution is transmitted to the host 102.

After selecting the detected class, when parameter values are inputted from the host 102, the memory system 110 may update the parameter values corresponding to the detected class with the parameter values inputted from the host 102. That is, when the parameter values are inputted from the host 102, the memory system 110 may update the workload table <one of 1:N> 225 corresponding to the detected class stored in the internal storage space with the parameter values inputted from the host 102, and then update parameter values corresponding to the detected class among the workload table<1:N> 220 stored in the specific storage space with the updated workload table <one of 1:N> 225 corresponding to the detected class stored in the internal storage space.

More specifically, the host 102 may include a command generator 310, a performance analyzer 320, and a parameter generator 330.

The command generator 310 may generate the set command at a ratio corresponding to the determined class and output the generated set command to the memory system 110.

The performance analyzer 320 may calculate the performance result of the memory system 110 by analyzing the execution completion response to the set command outputted from the memory system 110 as a result of executing the set command.

The parameter generator 330 may generate parameter values on the basis of the performance result of the memory system 110 calculated by the performance analyzer 320, and output the generated parameter values to the memory system 110.

The controller 130 included in the memory system 110 may include a host interface (I/F) 132, a processor 134, a memory interface (I/F) 142, and a memory 144. The host I/F 132 may include a command detector 230, a workload selector 240, an update controller 250, and a response adjuster (ack adjuster) 260. The processor 134 may include a command operator 270.

The processor 134 may be implemented as a microprocessor or a central processing unit (CPU), and may control the overall operation of the memory system 110.

The processor 134 drives firmware called a flash translation layer (hereinafter, referred to as FTL) in order to control the overall operation of the memory system 110.

Particularly, the command operator 270 included in the processor 134 in accordance with an embodiment of the present disclosure may perform operations corresponding to all commands applied from the host 102, and transmit execution results to the host 102. That is, the command operator 270 may perform the operations corresponding to all commands applied from the host 102 through the host I/F 132, and then output execution completion responses from all commands to the host 102 through the host I/F 132.

All commands may include a command for performing a foreground operation on the memory device 150. In such a case, the foreground operation may include, for example, a write operation corresponding to a write command, a read operation corresponding to a read command, an erase operation corresponding to an erase command, and the like.

All commands may also include a command for performing a background operation on the memory device 150. In such a case, the background operation may include an operation for performing an operation of copying data stored in an arbitrary memory block in the memory blocks 152, 154, and 156 of the memory device 150 to another arbitrary memory block and processing the data, for example, a garbage collection operation and a read reclaim operation. The background operation may also include an operation of swapping and processing the memory blocks 152, 154, and 156 of the memory device 150 or swapping and processing data stored in the memory blocks 152, 154, and 156, for example, a wear leveling (WL) operation. The background operation may also include an operation of storing map data in the memory blocks 152, 154, and 156 of the memory device 150, for example, a map flush operation. The background operation may also include a bad block management operation on the memory device 150, for example, a bad block management operation of checking and processing bad blocks in the plurality of memory blocks 152, 154, and 156 included in the memory device 150.

According to an embodiment, when a read command is applied from the host 102 through the host I/F 132, the command operator 270 may complete a read operation, and then output a response signal indicating that the execution of the read operation is completed together with read data to the host 102 through the host I/F 132 as an execution completion response corresponding to the read command.

According to another embodiment, when a write command is applied from the host 102 through the host I/F 132, the command operator 270 may complete a write operation, and then output a response signal indicating that the execution of the write operation is completed to the host 102 through the host I/F 132 as an execution completion response corresponding to the write command.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102 via a bus. For example, the host 102 and the memory system 110 may use a predetermined set of rules or procedures for data communication or a preset interface to transmit and receive data therebetween.

Examples of communication standards or interfaces used to transmit/receive data may include various form factors such as 2.5-inch form factor, 1.8-inch form factor, MO-297, MO-300, M.2, and EDSFF (Enterprise and Data Center SSD Form Factor) and various communication standards or Interfaces such as UART (Universal asynchronous receiver/transmitter), USB (Universal Serial Bus), MMC (MultiMedia Card), PATA (Parallel Advanced Technology Attachment), SCSI (Small Computer System Interface), ESDI (Enhanced Small Disk Interface), IDE (Integrated Drive Electronics), PCIe (Peripheral Component Interconnect Express), SAS (Serial-attached SCSI), SATA (Serial Advanced Technology Attachment), and MIPI (Mobile Industry Processor Interface).

For reference, it is possible to use two or more different interface protocols among various interface protocols according to the type and characteristics of a signal transmitted/received between the host 102 and the memory system 110. For example, a PCIe interface protocol may be used when commands, addresses, and data are transmitted between the host 102 and the memory system 110, and a UART interface protocol may be used when the host 102 outputs parameter values with a specific workload class to the memory system 110.

Particularly, the host I/F 132 in accordance with an embodiment of the present disclosure may select one of the plurality of workload classes as the detected class according to a result of detecting a ratio at which the set command is inputted from the host 102.

The host I/F 132 may also check parameter values corresponding to the detected class from the workload information of the specific storage space.

The host I/F 132 may adjust the time point at which the execution completion response to the set command transmitted from the command operator 270 included in the processor 134 is transmitted to the host 102 by applying the parameter values corresponding to the detected class.

When parameter values are inputted from the host 102, the host I/F 132 may update the parameter values corresponding to the detected class with the parameter values inputted from the host 102.

More specifically, the command detector 230 included in the host I/F 132 may detect a ratio at which the set command is inputted among all commands inputted from the host 102.

The workload selector 240 included in the host I/F 132 may select one of the plurality of workload classes as the detected class in response to an output signal of the command detector 230.

In such a case, the workload selector 240 may select the detected class, and then request the processor 134 to load the workload table <one of 1:N> 225 corresponding to the detected class included in the workload table<1:N> 220 stored in the specific storage space and to store the workload table <one of 1:N> 225 in the memory 144 including an internal storage space having volatile characteristics.

The workload selector 240 may also calculate a command completion delay time according to the parameter values corresponding to the detected class. That is, the workload selector 240 may calculate the command completion delay time according to the parameter values corresponding to the detected class stored in the internal storage space of the memory 144.

On the basis of the command completion delay time calculated by the workload selector 240, the response adjuster 260 included in the host I/F 132 may adjust the time point at which the execution completion response to the set command transmitted from the command operator 270 of the processor 134 is transmitted to the host 102.

When the parameter values are inputted from the host 102, the update controller 250 included in the host I/F 132 may update the parameter values corresponding to the detected class with the parameter values inputted from the host 102.

In such a case, when the parameter values are inputted from the host 102, the update controller 250 may update the workload table <one of 1:N> 225 corresponding to the detected class stored in the internal storage space of the memory 144 with the parameter values inputted from the host 102.

The update controller 250 may also request the processor 134 to update the parameter values corresponding to the detected class among the workload table<1:N> 220 stored in the specific storage space of the memory device 150 with updated parameter values stored in the internal storage space of the memory 144 at each setting time point. The setting time point may be predefined by the update controller 250. For example, the update controller 250 may define, as the setting time point, a period in which the workload table <one of 1:N> 225 of the internal storage space is updated once with the parameter values inputted from the host 102, and request the processor 134 to update the workload table<1:N> 220 stored in the specific storage space with the workload table <one of 1:N> 225 of the internal storage space whenever the workload table <one of 1:N> 225 of the internal storage space is updated once.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data which occurred or was delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 in order to perform operations such as read operations, program/write operations or erase operation.

The memory 144 may be realized by a volatile memory. For example, the memory 144 may be realized by a static random access memory (SRAM) or a dynamic random access memory (DRAM). The memory 144 may exist inside the controller 130 as illustrated in the drawing. Alternatively, the memory 144 may exist outside the controller 130 unlike the illustration of the drawing. In this case, the memory 144 may be realized as an external volatile memory to and from which data is inputted and outputted from and to the controller 130 through a separate memory interface.

As described above, the memory 144 may store data required for performing data write and read operations and the like between the host 102 and the memory device 150, data required when the data write and read operations and the like are performed, and parameter values class table<one of 1:N> corresponding to the detected class selected by the host I/F 132 among the workload information corresponding to the plurality of workload classes. The memory 144 may include a data memory, a write buffer/cache, a read buffer/cache, a data buffer/cache, a map buffer/cache, and the like in order to store such data. In the above, n may be a variable corresponding to 'a plurality of' and may be a natural number of 2 or more.

Figure 2:
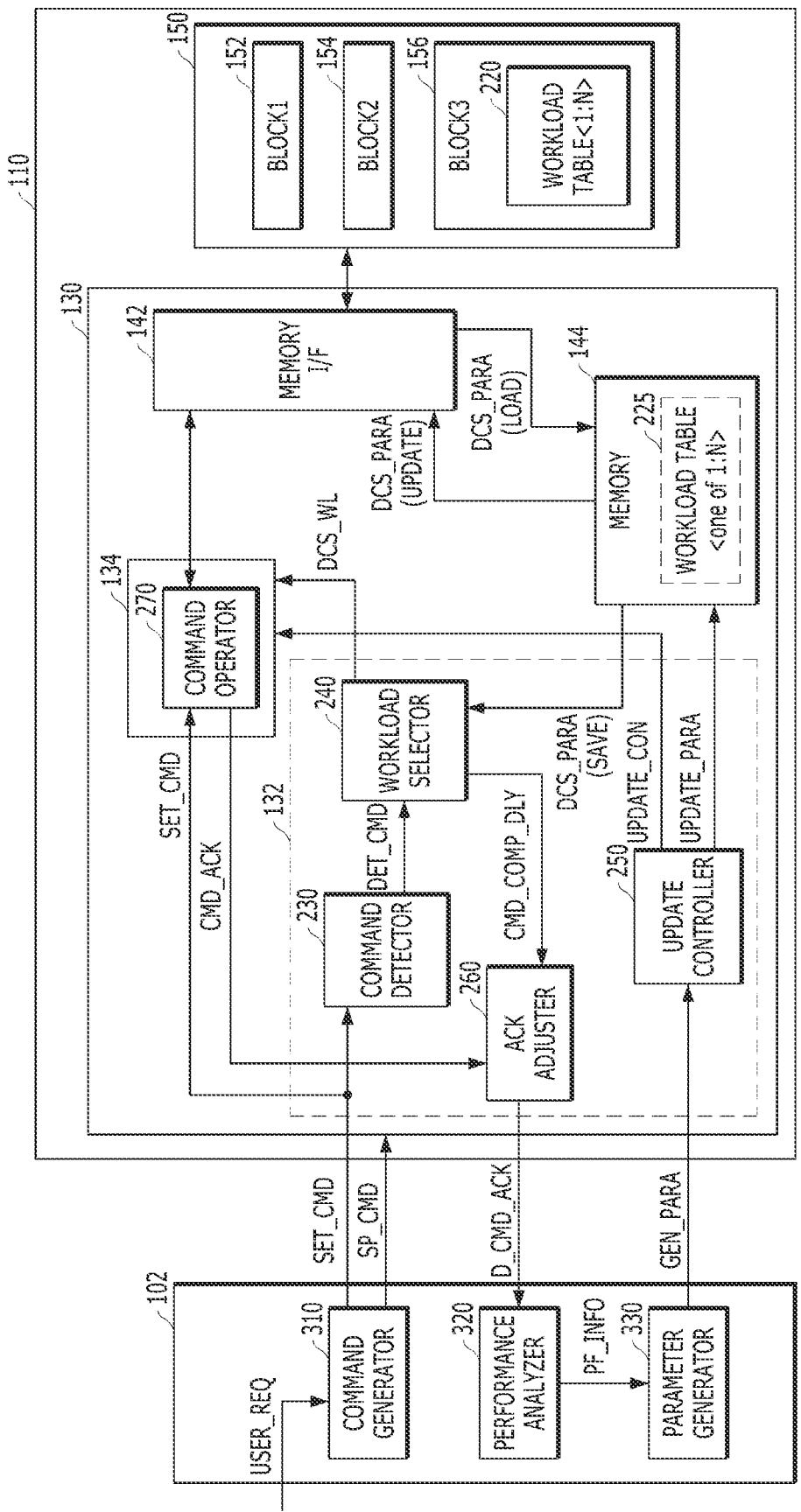
FIG. 2 is a diagram for describing operations of components included in the data processing system illustrated in FIG. 1 in accordance with an embodiment of the present disclosure.

FIG. 2 is a diagram for describing operations of components included in the data processing system 100 illustrated in FIG. 1 in accordance with an embodiment of the present disclosure.

Referring to FIG. 1 and FIG. 2, the data processing system 100 in accordance with an embodiment of the present disclosure may include the host 102 and the memory system 110. The host 102 may include the command generator 310, the performance analyzer 320, and the parameter generator 330. The memory system 110 may include the controller 130 and the memory device 150. The controller 130 may include the host I/F 132, the processor 134, the memory I/F 142, and the memory 144. The host I/F 132 may include the command detector 230, the workload selector 240, the update controller 250, and the response adjuster 260. The processor 134 may include the command operator 270. The memory device 150 may include the plurality of memory blocks 152, 154, and 156.

The memory system 110 may operate at one of the plurality of workload classes, and the QOS of the memory system 110 may be adjusted according to a workload class at which the memory system 110 operates. That is, the memory system 110 may adjust an execution condition for processing a command requested by the host 102 according to a workload class at which the memory system 110 operates among the plurality of workload classes, so that the QOS of the memory system 110 may be adjusted. The QOS may mean a concept including various elements that may be evaluation indicators of the operation of the memory system 110, and include data throughput per hour, capacity, data persistency, data reliability, latency, uniformity of response time, predictability of response time, power consumption, and the like of the memory system 110.

Particularly, in the process of producing the memory system 110, a manufacturer may generate, through a test, the workload table<1:N> 220 including groups of parameter values corresponding to the respective workload classes in the form of a table, store the workload information workload table<1:N> 220 in the memory device 150, and then output the workload information workload table<1:N> 220 to the memory system 110. That is, the value of the workload table<1:N> 220 stored in the memory device 150 at the time point at which the memory system 110 is shipped may be determined by the manufacturer. In such a case, the memory device may include at least partially a nonvolatile memory area therein, and the workload table<1:N> 220 may be stored in the specific storage space of the nonvolatile memory area.

When the memory system 110 is connected to the host 102 in accordance with an embodiment of the present disclosure and is mounted for use, the host 102 may enter a set operation mode and operate the memory system 110 at a specific one of the plurality of workload classes. The host 102 may also receive a result D_CMD_ACK from the memory system 110 operating at the specific workload class and check the performance of the memory system 110. The host 102 may also generate optimized parameter values GEN_PARA corresponding to the specific workload class according to the checked performance result of the memory system 110, and transmit the generated optimized parameter values GEN_PARA to the memory system 110. In such a case, when the optimized parameter values GEN_PARA corresponding to the specific workload class are inputted from the host 102, the memory system 110 may update the parameter values DCS_PARA corresponding to the specific workload class among the workload table<1:N> 220 stored in the specific storage area with the inputted optimized parameter values GEN_PARA. In summary, the host 102 may enter the set operation mode and update the workload table<1:N> 220 stored in the specific storage space of the memory system 110 with an optimized value.

Specifically, when the memory system 110 is connected to the host 102 and is mounted for use, the host 102 may enter the set operation mode according to a user's request USER_REQ, determine one of the plurality of workload classes selectable by the memory system 110 as a determined class, generate a set command SET_CMD at a ratio corresponding to the determined class, and then output the generated set command SET_CMD to the memory system 110. In such a case, the set command SET_CMD may include at least one of a read command and a write command. The host 102 may also enter the set operation mode according to the set user's request USER_REQ, generate a specific command SP_CMD, and transmit the generated specific command SP_CMD to the memory system 110, thereby allowing the memory system 110 to enter the set operation mode.

According to an embodiment, the host 102 may know in advance the plurality of workload classes selectable by the memory system 110, and request a user to determine and select one of the plurality of workload classes as the determined class. That is, the host 102 may enter the set operation mode according to the user's request USER_REQ, and then determine one of the plurality of workload classes as the determined class according to the user's request USER_REQ.

More specifically, in the set operation mode entered according to the user's request USER_REQ, the command generator 310 included in the host 102 may generate the set command SET_CMD at a ratio corresponding to the determined class determined according to the user's request USER_REQ, and output the generated set command SET_CMD to the memory system 110. When entering the set operation mode according to the user's request USER_REQ, the command generator 310 may also generate the specific command SP_CMD indicating entry into the set operation mode and output the generated specific command SP_CMD to the memory system 110. The command generator 310 may also generate the specific command SP_CMD indicating exit from the set operation mode when exiting from the set operation mode according to the user's request USER_REQ, and output the generated specific command SP_CMD to the memory system 110.

Then, the controller 130 of the memory system 110 may enter the set operation mode in response to the specific command SP_CMD inputted from the host 102, detect a ratio at which the set command SET_CMD is inputted from the host 102, and select one of the plurality of workload classes as the detected class according to the detection result.

In such a case, after selecting the detected class, the controller 130 may check the parameter values corresponding to the detected class through the workload table<1:N> 220 stored in the specific storage space of the memory device 150, and process the set command SET_CMD inputted from the host 102 under the execution condition determined by applying the checked parameter values corresponding to the detected class. That is, the controller 130 may load the workload table <one of 1:N> 225 corresponding to the detected class from the workload table<1:N> 220 stored in the specific storage space of the memory device 150 to the internal storage space having volatile characteristics, and process the set command SET_CMD inputted from the host 102 under the execution condition determined by applying the workload table <one of 1:N> 225 corresponding to the detected class stored in the internal storage space. In such a case, processing the set command SET_CMD by the controller 130 may mean performing by the controller 130 an operation of the set command SET_CMD inputted from the host 102 and then outputting, to the host 102, the execution completion response D_CMD_ACK for notifying the host 102 that the execution is complete.

More specifically, the command detector 230 included in the controller 130 may detect a ratio at which the set command SET_CMD is inputted among all commands inputted from the host 102.

According to an embodiment, the command detector 230 may detect the ratio of the total number of addresses obtained by accumulating and summing the number of addresses of all commands inputted from the host 102 and the number of set addresses obtained by accumulating and summing only the number of addresses of the set command in all commands, and detect a ratio at which the set command SET_CMD is inputted among all commands. For example, all commands may include a write command and a read command and the set command SET_CMD is a write command. In such a case, the command detector 230 may detect the ratio of the total number of logical addresses obtained by summing the number of logical addresses of the write command and the number of logical addresses of the read command and the number of write logical addresses obtained by summing only the number of logical addresses of the write command.

In such a case, when the number of all commands inputted from the host 102 is equal to or greater than a reference number, the accuracy of a value obtained by detecting the ratio at which the set command SET_CMD is inputted among all commands may increase. Accordingly, when the number of all inputted commands is equal to or greater than the reference number, the command detector 230 may detect an input ratio of the set command SET_CMD among all commands. For example, when the total number of addresses obtained by accumulating and summing the number of addresses of all commands is equal to or greater than the reference number of addresses, the command detector 230 may detect a ratio at which the set command SET_CMD is inputted among all commands.

The workload selector 240 included in the controller 130 may select one of the plurality of workload classes as the detected class in response to an output signal DET_CMD of the command detector 230. In such a case, the workload selector 240 may select the detected class, and then request (DCS_WL) the processor 134 to load the workload table <one of 1:N> 225 corresponding to the detected class included in the workload table<1:N> 220 stored in the specific storage space and to store the workload table <one of 1:N> 225 in the memory 144 including an internal storage space having volatile characteristics.

In response to the above request DCS_WL of the workload selector 240, the processor 134 may load (DSC_PARA (LOAD)), through the memory I/F 142, the workload table <one of 1:N> 225 corresponding to the detected class included in the workload table<1:N> 220 stored in the specific storage space of the memory device 150, and store the workload table <one of 1:N> 225 in the internal storage space of the memory 144.

The workload selector 240 may also calculate a command completion delay time COM_COMP_DLY according to the workload table <one of 1:N> 225 corresponding to the detected class. That is, the workload selector 240 may calculate the command completion delay time COM_COMP_DLY according to the workload table <one of 1:N> 225 corresponding to the detected class stored in the internal storage space of the memory 144.

On the basis of the command completion delay time COM_COMP_DLY calculated by the workload selector 240, the response adjuster 260 included in the controller 130 may adjust (D_CMD_ACK) the time point at which an execution completion response CMD_ACK of the set command SET_CMD transmitted from the command operator 270 of the processor 134 is transmitted to the host 102.

The host 102 may detect a performance result PF_INFO of the memory system 110 through the execution completion response D_CMD_ACK of the set command SET_CMD inputted from the memory system 110, generate the parameter values GEN_PARA corresponding to the detection result, and transmit the generated parameter values GEN_PARA to the memory system 110.

More specifically, the performance analyzer 320 included in the host 102 may calculate the performance result PF_INFO of the memory system 110 by analyzing the execution completion response D_CMD_ACK of the set command SET_CMD outputted from the memory system 110 as a result of executing the set command SET_CMD by the memory system 110. According to an embodiment, the performance analyzer 320 may analyze the difference between the time point at which the host 102 generates the set command SET_CMD and outputs the set command SET_CMD to the memory system 110 and the time point at which the execution completion response D_CMD_ACK of the set command SET_CMD is inputted to the host 102. According to another embodiment, the performance analyzer 320 may compare and analyze the number of set commands SET_CMD generated by the host 102 during a predetermined time period and the number of execution completion responses D_CMD_ACK of the set command SET_CMD inputted from the memory system 110. For reference, as a method in which the performance analyzer 320 analyzes the execution completion response D_CMD_ACK of the set command SET_CMD, various methods other than the above-described embodiments may exist.

On the basis of the performance result PF_INFO of the memory system 110 calculated by the performance analyzer 320, the parameter generator 330 included in the host 102 may generate the parameter values GEN_PARA and output the generated parameter values GEN_PARA to the memory system 110. In such a case, on the basis of the performance result PF_INFO of the memory system 110 calculated by the performance analyzer 320, the parameter generator 330 may generate the parameter values GEN_PARA for controlling the memory system 110 so that the number of set commands SET_CMD completely executed by the memory system 110 may be relatively maximized and the time required until the execution of the set command SET_CMD is completed by the memory system 110 is relatively shortened. According to an embodiment, the parameter generator 330 may generate the parameter values GEN_PARA by using a multi-objective optimization algorithm, aiming for a relative maximum value of I/O per second (IOPS) corresponding to the number of set commands SET_CMD completely executed by the memory system 110 and a relative minimum value of an I/O latency corresponding to the time required until the execution of the set command SET_CMD is completed by the memory system 110. For reference, since detailed content of the multi-objective optimization algorithm is a known technology, detailed description thereof will be omitted.

When the parameter values GEN_PARA are inputted from the host 102 in the set operation mode, the controller 130 may update the parameter values DCS_PARA corresponding to the detected class with the parameter values GEN_PARA inputted from the host 102. That is, when the parameter values GEN_PARA are inputted from the host 102, the controller 130 may update (UPDATE_PARA) the workload table <one of 1:N> 225 corresponding to the detected class stored in the internal storage space with the parameter values GEN_PARA inputted from the host 102, and then update the parameter values corresponding to the detected class among the workload table<1:N> 220 stored in the specific storage space of the memory device 150 with the workload table <one of 1:N> 225 updated corresponding to the detected class stored in the internal storage space at each setting time point.

More specifically, when the parameter values GEN_PARA are inputted from the host 102, the update controller 250 included in the controller 130 may update the parameter values DCS_PARA corresponding the detected class with the parameter values GEN_PARA inputted from the host 102.

In such a case, when the parameter values GEN_PARA are inputted from the host 102, the update controller 250 may update (UPDATE_PARA) the workload table <one of 1:N> 225 corresponding to the detected class stored in the internal storage space with the parameter values GEN_PARA inputted from the host 102.

The update controller 250 may also request (UPDATE_CON) the processor 134 to update the parameter values corresponding to the detected class among the workload table<1:N> 220 stored in the specific storage space of the memory device 150 with updated parameter values DCS_PARA (UPDATE) stored in the internal storage space of the memory 144 at each setting time point. In response to the above request UPDATE_CON of the update controller 250, the processor 134 may transmit the updated parameter values DCS_PARA (UPDATE) stored in the internal storage space to the memory device 150 through the memory I/F 142, and update parameter values corresponding to the detected class among the workload table<1:N> 220 stored in the specific storage space of the memory device 150.

The setting time point may be predefined by the update controller 250. For example, the update controller 250 may define, as the setting time point, a period in which the workload table <one of 1:N> 225 of the internal storage space is updated once with the parameter values inputted from the host 102, and request the processor 134 to update the workload table<1:N> 220 stored in the specific storage space with the workload table <one of 1:N> 225 of the internal storage space whenever the workload table <one of 1:N> 225 of the internal storage space is updated once.

Figure 3:
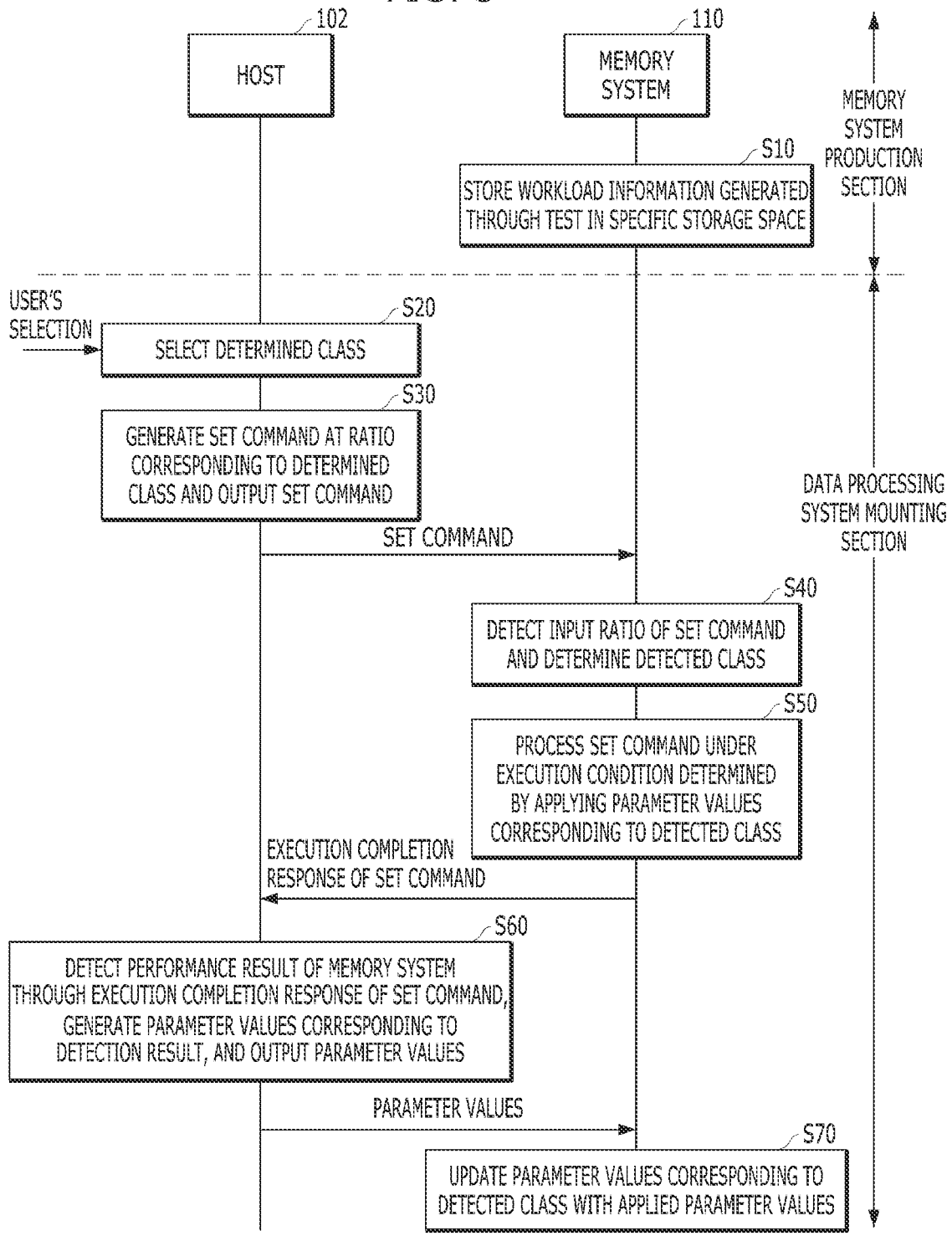
FIG. 3 and FIG. 4 are diagrams for describing operations of the data processing system in accordance with an embodiment of the present disclosure.
Figure 4:
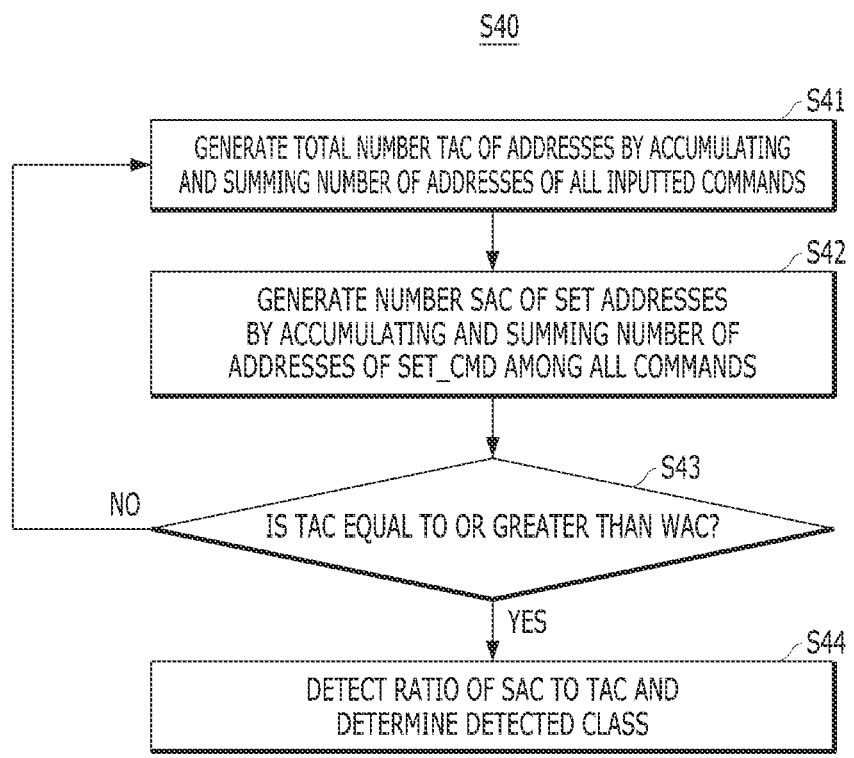

FIG. 3 and FIG. 4 are diagrams for describing operations of the data processing system 100 in accordance with an embodiment of the present disclosure.

First, referring to FIG. 3, the manufacturer may divide the operation section of the data processing system 100 into a 'memory system production section' for producing the memory system 110 and a 'data processing system mounting section' in which the memory system 110 is connected to the host 102 to be mounted for use as the data processing system 100.

Specifically, in the 'memory system production section', workload information including groups of parameter values corresponding to the respective workload classes in the form of a table may be generated through the test on the memory system 110, and the generated workload information may be stored in the specific storage space of the memory system 110 (S10).

In the 'data processing system mounting section', the host 102 may select a determined class that is one of the plurality of workload classes (S20). The operation in which the host 102 determines the determined class among the plurality of workload classes may be performed according to a user's request.

After the operation of S20, the host 102 may generate a set command at a ratio corresponding to the determined class and output the generated set command to the memory system 110 (S30). In such a case, the set command may include at least one of a read command and a write command.

The memory system 110 may detect a ratio at which the set command is inputted among all commands inputted from the host 102 through the operation of S30, and select one of the plurality of workload classes as a detected class according to the detection result (S40).

The memory system 110 may process the set command inputted from the host 102 under an execution condition determined by applying parameter values corresponding to the detected class determined in the operation of S40 (S50). After processing the set command in the operation of S50, the memory system 110 may output an execution completion response for notifying the host 102 that the processing is completed to the host 102. That is, the memory system 110 may perform an operation corresponding to the set command, and generate the execution completion response to the set command as a result of the execution. In such a case, the memory system 110 may calculate a command comple-tion delay time under the determined execution condition by applying the parameter values corresponding to the detected class determined in the operation of S40, and adjust the time point at which the execution completion response to the set command is transmitted to the host 102 on the basis of the calculated command completion delay time.

Referring to FIG. 3 and FIG. 4 together, the operation of S40 may include the following operations.

The memory system 110 may generate the total number TAC of addresses by accumulating and summing the number of addresses of all commands inputted from the host 102 (S41).

The memory system 110 may generate the number SAC of set addresses by accumulating and summing only the number of addresses of the set command SET_CMD among all commands inputted from the host 102 (S42).

The memory system 110 may check whether the total number TAC of addresses generated through the operation of S41 is equal to or greater than a reference number WAC (S43). In the operation of S43, when the total number TAC of addresses is less than the reference number WAC (no in S43), the memory system 110 may repeatedly perform the operations of S41 and S42 until the total number TAC of addresses is equal to or greater than the reference number WAC (yes in S43).

When the total number TAC of addresses is equal to or greater than the reference number WAC in the operation of S43 (yes in S43), the memory system 110 may detect a ratio of the number SAC of set addresses among the total number TAC of addresses, and determine a detected class according to the detection result (S44).

Referring back to FIG. 3, the host 102 may detect the performance result of the memory system 110 through the execution completion response to the set command outputted from the memory system 110 as a result of executing the set command, generate parameter values corresponding to the detection result, and output the generated parameter values to the memory system 110 (S60). That is, the host 102 may calculate the performance result of the memory system 110 by analyzing the execution completion response to the set command outputted from the memory system 110. On the basis of the calculated performance result of the memory system 110, the host 102 may generate parameter values for controlling the memory system 110 so that the number of set commands completely executed by the memory system 110 is relatively maximized and the time required until the execution of the set command is completed by the memory system 110 is relatively shortened, and output the generated parameter values to the memory system 110.

When the parameter values are inputted from the host 102 as a result of the operation of S60, the memory system 110 may update parameter values corresponding to the detected class with the parameter values inputted from the host 102 (S70).

Although not illustrated in the drawing, the host 102 may enter a set operation mode according to a user's request before performing the operation of S20. When entering the set operation mode, the host 102 may generate a specific command indicating the entry and transmit the generated specific command to the memory system 110. The memory system 110 may enter the set operation mode in response to the specific command inputted from the host 102. Similarly, after the operations of S20, S30, S40, S50, S60, and S70 are repeated once or more, the host 102 may exit from the set operation mode according to a user's request. When exiting from the set operation mode, the host 102 may generate a specific command indicating the exit. The memory system 110 may exit from the set operation mode in response to the specific command inputted from the host 102.

The present disclosure described above is not limited to the aforementioned embodiments and the accompanying drawings, and it will be obvious to those skilled in the art to which the present disclosure pertains that various replacements, modifications, and changes can be made without departing from the technical spirit of the present disclosure and the following claims.

For example, the position and the type of a logic gate and a transistor exemplified in the aforementioned embodiment should be differentially realized according to the polarity of an inputted signal. Furthermore, the embodiments may be combined to form additional embodiments.

What is claimed is:

1. A memory system comprising:
a memory device having a nonvolatile specific storage space configured to store workload information including groups of parameter values, grouped respectively corresponding to a plurality of workload classes in a table form; and
a controller configured to control the memory device,
wherein the controller comprises:
a command detector configured to detect the ratio at which the set command is inputted among all commands inputted from the outside in the set operation mode;
a workload selector configured to select the detected class according to the ratio, load the parameter values corresponding to the detected class from the specific storage space to the internal storage space, and calculate a command completion delay time according to the parameter values corresponding to the detected class;
an update controller configured to update the loaded parameter values with the inputted parameter values, and update the workload information of the specific storage space with the updated parameter values;
a command operator configured to processes the set command by performing an operation corresponding to the set command to provide the outside with an execution completion response to the set command; and
a response adjuster configured to adjust, on the basis of the command completion delay time, a time point at which the execution completion response is provided.

2. The memory system of claim 1, wherein the controller is further configured to enter the set operation mode in response to a specific command inputted from the outside.

3. The memory system of claim 1, wherein the set command is at least one of a write command and a read command.

4. An operation method of a data processing system including a memory system and an external device, the memory system including a specific storage space having nonvolatile characteristics and the external device for controlling an operation of the memory system, the operation method comprising:
generating, by a test on the memory system performed in an external test device, workload information including groups of parameter values in a table form, the groups corresponding to respective workload classes;
storing, by the memory system, the workload information in the specific storage space;
entering and exiting, by the external device, from a set operation mode while providing a specific command to the memory system;
entering and exiting, by the memory system, from the set operation mode in response to the specific command;
determining, by the external device, one of the plurality of workload classes as a determined class, which is determined and a set command is generated and outputted in the set operation mode;
generating, by the external device, the set command at a ratio corresponding to the determined class;
outputting, by the external device, the set command to the memory system;
detecting, by the memory system, the ratio of the set command to all commands inputted from the external device in the set operation mode;
selecting, by the memory system, one of the plurality of workload classes as a detected class according to a result of the detecting the ratio;
processing, by the memory system, the set command under an execution condition determined by applying the group corresponding to the detected class from the workload information;
detecting, by the external device, a performance result of the memory system through a result of the processing;
generating, by the external device, parameter values corresponding to the performance result;
outputting, by the external device, the parameter values corresponding to the performance result to the memory system; and
updating, by the memory system, the parameter values corresponding to the detected class with the parameter values inputted from the external device,
wherein the processing of the set command includes:
performing an operation corresponding to the set command under the determined execution condition;
generating an execution completion response to the set command as a result of the performing;
calculating a command completion delay time according to the parameter values corresponding to the detected class; and
adjusting, on the basis of the command completion delay time, a time point at which the execution completion response is transmitted to the external device.

5. The operation method of claim 4, wherein the detecting the performance result includes calculating the performance result by analyzing the execution completion response inputted from the memory system in the set operation mode.

6. The operation method of claim 5, wherein the parameter values corresponding to the performance result are generated so that a number of completely processed set commands is maximized and time required to completely process the set command is shortened.

7. The operation method of claim 4, wherein the set command is at least one of a write command and a read command.

8. A data processing system comprising:
a memory system configured to
store, in an internal specific storage space having nonvolatile characteristics, workload information including groups of parameter values in a table form, the groups corresponding to respective workload classes,
detect a ratio of a set command inputted from an external device in a set operation mode,
select one of the plurality of workload classes as a detected class according to a result of the detecting the ratio,
process the set command under an execution condition determined by applying the group corresponding to the detected class from the workload information, and
update the group corresponding to the detected class with parameter values inputted from the external device; and the external device configured to
- generate the set command at the ratio corresponding to one determined class of the plurality of workload classes,
- output the set command to the memory system, detect a performance result of the memory system through a result of the processing,
- generate the parameter values corresponding to the performance result, and
- output the parameter values to the memory system, wherein the memory system comprises:

a memory device including the specific storage space; and
a controller configured to control the memory device,
wherein the controller comprises:
- a command detector configured to detect the ratio at which the set command is inputted among all commands in a set operation mode;
- a workload selector configured to select the detected class according to the ratio, load the parameter values corresponding to the detected class from the specific storage space to an internal storage space having volatile characteristics, and calculate a command completion delay time according to the parameter values corresponding to the detected class;
- an update controller configured to update the loaded parameter values with the inputted parameter values, and update the workload information of the specific storage space with the updated parameter values;
- a command operator configured to processes the set command by performing an operation corresponding to the set command to provide the external device with an execution completion response to the set command; and
- a response adjuster configured to adjust, on the basis of the command completion delay time, a time point at which the execution completion response is provided.

9. The data processing system of claim 8, wherein the external device comprises:
- a command generator configured to generate the set command at the ratio corresponding to the determined class in the set operation mode, and output the set command to the memory system;
- a performance analyzer configured to calculate the performance result by analyzing the execution completion response inputted from the memory system; and
- a parameter generator configured to generate the parameter values corresponding to the performance result on the basis of the performance result, and output the parameter values corresponding to the performance result to the memory system.

10. The data processing system of claim 9, wherein the parameter generator generates the parameter values corresponding to the performance result so that a number of completely processed set commands is maximized and time required to completely process the set command is shortened.

11. The data processing system of claim 9,
wherein the command generator is further configured to enter and exit from the set operation mode while providing a specific command to the memory system, and
wherein the controller is further configured to enter and exit from the set operation mode in response to the specific command.

12. The data processing system of claim 11, wherein the command generator determines the determined class when entering the set operation mode.

13. The data processing system of claim 8, wherein the set command is at least one of a write command and a read command.

* * * * *